(12) United States Patent
Highsmith et al.

(10) Patent No.: US 6,771,276 B1
(45) Date of Patent: Aug. 3, 2004

(54) TWO-DIMENSIONAL DRAWING ENVIRONMENT UTILIZING PERSPECTIVE GRIDS

(75) Inventors: Delores Highsmith, Richardson, TX (US); Fan Yu, Allen, TX (US); David Halpin, Richardson, TX (US)

(73) Assignee: Macromedia, Inc., San Francisco, CA (US)

( * ) Notice: Subject to any disclaimer, the term of this patent is extended or adjusted under 35 U.S.C. 154(b) by 538 days.

(21) Appl. No.: 09/697,856

(22) Filed: Oct. 27, 2000

(51) Int. Cl.[7] ................................. G09G 5/00
(52) U.S. Cl. ................ 345/619; 345/419; 345/427
(58) Field of Search ................... 345/419–619

(56) References Cited

U.S. PATENT DOCUMENTS

| | | | | |
|---|---|---|---|---|
| 4,835,532 A | * | 5/1989 | Fant | 345/611 |
| 5,490,241 A | * | 2/1996 | Mallgren et al. | 345/440 |
| 5,894,308 A | * | 4/1999 | Isaacs | 345/420 |
| 5,988,862 A | * | 11/1999 | Kacyra et al. | 703/6 |
| 6,046,745 A | * | 4/2000 | Moriya et al. | 345/420 |
| 6,072,498 A | * | 6/2000 | Brittain et al. | 345/428 |

OTHER PUBLICATIONS

Microsoft Press, Microsoft Press Computer Dictionary, 1997, Microsoft, third edition, p. 88 (copies submitted pp. 1–2).*

* cited by examiner

Primary Examiner—Kristine Kincaid
Assistant Examiner—Lê V Nguyen
(74) Attorney, Agent, or Firm—Fulbright & Jaworski L.L.P.

(57) ABSTRACT

A two dimensional drawing environment which includes one or more perspective grids is disclosed. The preferred embodiment method for providing a perspective view of an object in the two dimensional drawing environment, comprises the steps of creating a two dimensional perspective grid drawing environment; drawing an object in the two dimensional drawing environment; selecting a grid in the two dimensional drawing environment; and applying the drawn object to the selected grid thereby automatically providing a perspective view of the object.

34 Claims, 9 Drawing Sheets

TWO-DIMENSIONAL DRAWING ENVIRONMENT UTILIZING PERSPECTIVE GRIDS

BACKGROUND

In traditional artistic works, an artist would create a desired visual effect by using a canvas and a paintbrush. However, with the advent of computer systems, many graphics applications have been developed that allow a user or an artist to express his creativity using modem graphical input devices, such as pens, tablets, stylus, brushes etc. to create attractive visual effects on the computer, which may be displayed on a computer screen and electronically printed, if desired. These artistic renditions may comprise various objects that may be manipulated either independently or in a group with the help of a graphics software application. Furthermore, the objects created may be interactively manipulated on the screen of the computer system with the help of the various input devices and the graphics software application.

Existing graphics applications may use a vector based system or a non-vector based system to draw the various objects or images. In a vector based system, objects may be described by a series of mathematical outlines or points. An example of a vector object would be a square which is defined by four points. On the other hand, in a non-vector based system, an object, such as a bitmapped object, is defined by all points on or within the object. A non-vector object is defined color point by color point inside of a memory space and thus, in a non-vector based system images are created by composing numerous tiny dots.

Typically in the software industry, vector objects are displayed on the screen during creation time to represent entities that a user, such as a graphic artist, wishes to represent. These vector objects have certain attributes that allow them to be scaled, displayed and printed at different resolutions while maintaining the same quality of the object or image. However, non-vector objects may not be easily scaled, displayed and printed at different resolutions while maintaining the same quality of the object or image.

In order to create realistic images having the desired depth, it is desirable to produce three dimensional (3D) images using computer software. For this purpose, graphics software applications for a 3D drawing environment are currently available. Such existing software applications include CAD programs. These 3D drawing environments are capable of creating 3D objects and depending on how the 3D objects are drawn the objects may appear to be drawn in perspective mode.

However, existing 3D tools for drawing 3D images or objects are very difficult to use. As a 3D environment involves the perception of depth, width and height, the user needs to be highly trained and work with a lot more information in a 3D environment than in a two dimensional (2D) environment. Hence, a user has to be sophisticated in order to create the drawings in a 3D environment. Thus, there are costs associated with training a user to work in a 3D environment. Moreover, because of the complexity and sophistication of 3D tools, existing 3D tools are very expensive and many sophisticated users who might be able to use these 3D tools may not be able to afford them. Furthermore, because of the computations involved in processing the 3D images, the hardware requirements of machines on which these 3D tools are used is more. Thus, the costs associated with using these 3D tools is further increased by the hardware costs.

Two dimensional graphics applications may be used to create a perspective drawing of an object to provide the perception of depth in an image. A perspective drawing is a representational two dimensional drawing of a three dimensional space, which allows an image to look realistic in a two dimensional plane. Currently, some 2D graphics applications provide limited tools which can be used to create a perspective image to provide the perception of depth. However, existing 2D graphics applications rely heavily upon the user to create the three dimensional effect. Also, a user can work with only one object at a time and an entire perspective image with multiple objects cannot be created as existing 2D applications do not allow two objects to be related or associated with each other or a third object. Thus, existing 2D graphics applications do not allow a user to work in a perspective environment.

For example, existing 2D graphics applications, such as FreeHand 5.0, allow a 3D translation to be applied to a 2D object to provide a perspective view of the object.

Figure 1A:
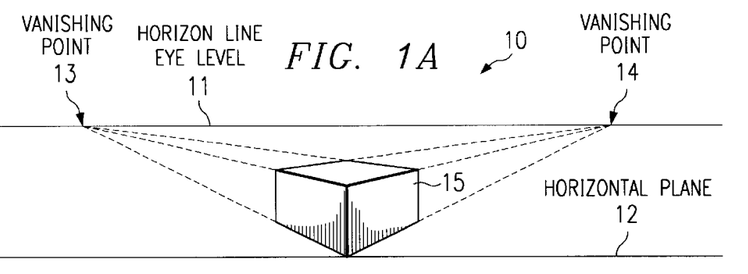
FIGS. 1A and 1B show the effects that can be created by existing two dimensional graphics applications.

FIGS. 1A and 1B show the effects that can be created by existing two dimensional graphics applications. A classical artistic technique utilized to render a 3-D representation upon a 2-D environment involves creating a horizon line and vanishing points. This type of technique is illustrated in drawing environment 10 of FIG. 1A which comprises a horizon line 11 and a horizontal plane 12. The horizon line is typically located at eye level. An object 15 is manually drawn between the horizon line and the horizontal plane, such that the vanishing points of the two sides of the object are located at points 13 and 14 on horizon line 11.

Figure 1B:
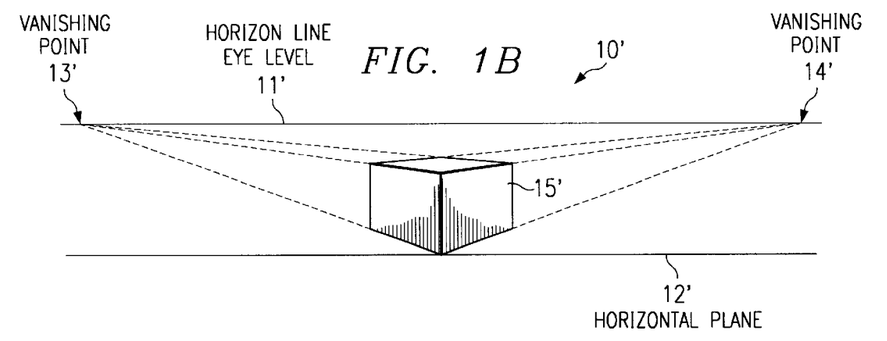

By changing the distance between the vanishing points 13 and 14, an object may appear to be translated within three dimension space. Thus, the drawing environment 10' of FIG. 1B comprises a horizon line 11' and a horizontal plane 12'. An object 15' is drawn between the horizon line and the horizontal plane, such that the distance between the vanishing points 13' and 14' is greater than the distance between the vanishing points 13 and 14 of FIG. 1A. Of course, changing the vanishing points requires manually rendering the various components of the object a second time in accordance with the new drawing environment. Thus, object 15' of FIG. 1B appears to be translated relative to the object 15 of FIG. 1A.

To accomplish this type of effect in a typical 2D graphics application, an artist is required to create the vanishing lines and the horizon line. Also, such artists must visualize how an object would look in perspective and then draw the object based on their visual perception. Certain tools may be utilized to aid this process, such as rotation or scaling tools.

However, the artist must effect changes to each and every object manually. Thus, in the prior art graphics applications users would spend considerable time visualizing the objects and then drawing them. However, because of the subjectivity involved in the prior art process the drawn objects were not necessarily accurate in their representation. Moreover, because the objects drawn by the users are based on estimates, it is difficult for the user to be consistent.

Another problem in the prior art is that the prior art does not allow portability of the created images. Thus, the images created using a particular graphics application may be used by only a few other graphics applications, usually those marketed or manufactured by the same entity. Furthermore, even when a particular graphics application allows another application to import the created images, some of the features of the exporting application may not be available in the importing application. Thus, the imported image is not identical to the original image and further changes may be required to be made in order to produce the desired effect. Thus, there are limitations in existing systems concerning the portability of the created images.

Therefore, there is a need in the art for a user friendly two-dimensional drawing environment that enables the user to create perspective images.

SUMMARY OF THE INVENTION

The present invention is directed to a system and method which in the preferred embodiment provides a two dimensional drawing environment which includes one or more perspective grids.

The preferred embodiment method for providing a perspective view of an object in a two dimensional drawing environment, comprises the steps of creating a two dimensional perspective grid drawing environment; drawing an object in the two dimensional drawing environment; selecting a grid in the two dimensional drawing environment; and applying the drawn object to the selected grid thereby automatically providing a perspective view of the object. By rendering a perspective grid environment, a spatial relationship between multiple objects may be established. Accordingly, a two-dimensional rendering may provide the appearance of three dimensional space.

In addition, the preferred embodiment defines a mapping relationship to apply a graphical object to a perspective grid. The preferred embodiment thereby transfers points defined in the two dimensional representation to a representation defined along the grid. The preferred embodiment utilizes vanishing points and distance from a vanishing points as parameters for the mapping relationship.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 2:
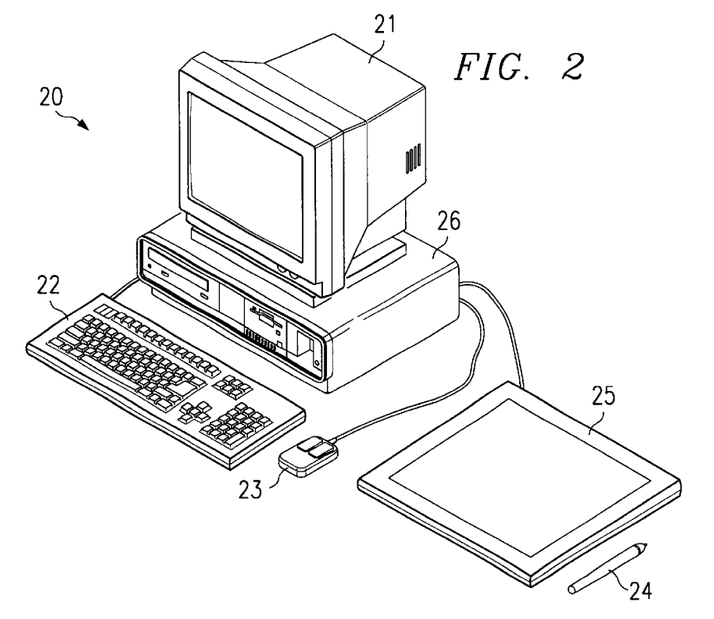
FIG. 2 illustrates a schematic of a computer system that may be used to implement a preferred embodiment of the present invention.

FIG. 2 illustrates a schematic of a computer system that may be used to implement a preferred embodiment of the present invention. System 20 comprises a display screen 21 and an input device 22, such as a keyboard. Also connected to display screen 21 is a mouse 23 and another input device 24, such as a stylus or a pen. Input device 24 is associated with a tablet 25. The tablet contains circuitry that enables it to detect movement of the stylus or pen and translate the movements into digital signals that are sent to a processing unit 26 associated with system 20. Processing unit 26 may be used for processing other data. Each point on the tablet represents a point on the display screen usually in a fixed manner. This differs from mouse 23 in which all movement is relative to the current cursor position. The static nature of the digitizing tablet makes it particularly effective for tracing drawings. Most modern digitizing tablets also support a mouse emulation mode, in which the pen or stylus acts like a mouse. Digitizing tablets are also called digitizers, graphics tablets, touch tablets, or simply tablets. Although the different embodiments of the present invention are described with regard to a tablet and a stylus, it is not so limited and any device capable of detecting the movement of an input device and translating the movement into digital signals that are sent to the processing unit may be used without departing from the spirit of the present invention.

System 20 may have software associated with it to allow a user to interact with processing unit 26 of system 20 and display the images on screen 21. The software may also be used to provide the desired manipulation of images displayed on screen 21. Display screen 21 may be used to display an image, such as a one or more perspective grids, one or more objects and/or the like, that may be created in different ways. For example, any of the input devices, such as a mouse, a keyboard, a stylus, or a pen may be used to create objects. Display screen 21 may also be used to display the object after it has been applied to a perspective grid, such as by selecting the object and dragging it to the grid.

In the preferred embodiment, computer system 20 is a processor based system having an operating system, such as Windows®, UNIX, Macintosh®, Linux and the like. In the preferred embodiment, system 20 includes at least 16 MB of Random Access Memory (RAM) and is associated with a device capable of storing data, such as a hard drive, a compact disk, a floppy disk, a tape, an optical disk, or the like.

A preferred embodiment of the present invention allows a graphical image, such as an object, to be displayed on display screen 21. The object may be defined by a user using any input device, such as the input devices shown and/or described with reference to FIG. 2, or it may be predefined in the graphics application and the user can select the different parameters of the object, such as the center or the radius of a predefined circle. The graphical image may be drawn with the help of the input devices mentioned herein.

Figure 3:
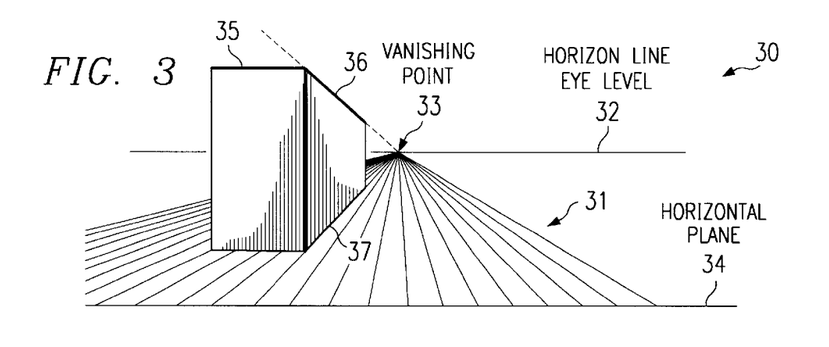
FIG. 3 shows an object drawn in a perspective environment with a single point perspective.
Figure 4:
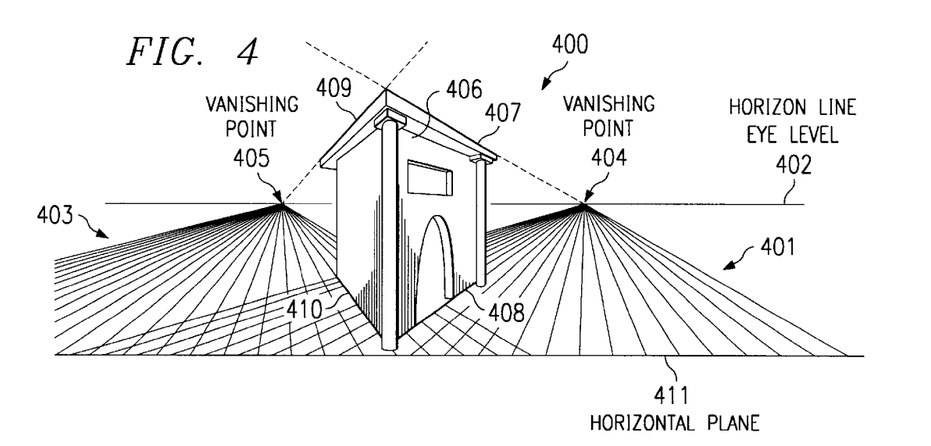
FIG. 4 shows an object drawn in a perspective environment with a two point perspective.
Figure 5:
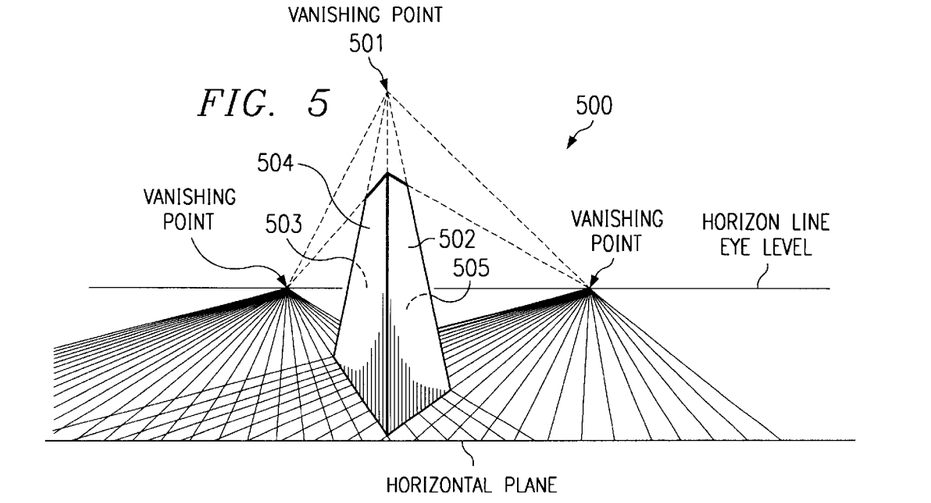
FIG. 5 shows an object drawn in a perspective environment with a three point perspective.

In order to better understand the present invention and its associated advantages, a discussion of different perspective modes is provided with reference to FIGS. 3–5.

Perspective layouts are designated as one, two or three point perspective. FIG. 3 shows an object drawn in a perspective environment with a single point perspective. As shown in FIG. 3, drawing environment 30 comprises a horizontal plane 31, a horizon line 32, and a vanishing point 33 located on the horizon line 32. The horizontal plane 31 comprises a plurality of grid lines drawn from line 34 to the horizon line 32. Preferably these grid lines are equidistant from each other along line 34 and converge at the vanishing point 33. An object 35 is drawn on the horizontal plane 31. Two edges 36 and 37 of object 35 are drawn in a manner to provide a three dimensional effect to the object. This is accomplished by drawing edges 36 and 37 in a manner that if those edges are extended beyond the object 36, they would meet at the vanishing point 33. This provides a desired perspective to object 35.

FIG. 4 shows an object drawn in a perspective environment with a two point perspective. A two point perspective image comprises at least two vanishing points. As shown in FIG. 4, drawing environment 400 comprises a first horizontal plane 401, a horizon line 402, a first vanishing point 404 located on the horizon line 402, a second horizontal plane 403, and a second vanishing point 405 located on the horizon line 402. The first horizontal plane 401 comprises a plurality of grid lines drawn from line 411 to the horizon line 402. Preferably these grid lines are equidistant from each other at line 411 and converge at the first vanishing point 404. The second horizontal plane 403 comprises a plurality of grid lines drawn from line 411 to the horizon line 402. Preferably these grid lines are equidistant from each other at line 411 and converge at the second vanishing point 405.

An object 406 is drawn on both the horizontal planes 401 and 403. The edges 407, 408, 409 and 410 of the object 406 are drawn in a manner to provide a three dimensional effect to the object. This is accomplished by drawing edges 407 and 408 in a manner that if those edges are extended beyond the object 406, they would meet at the first vanishing point 404 and drawing edges 409 and 410 in a manner that if those edges are extended beyond the object 406, they would meet at the second vanishing point 405. This provides a desired perspective to the object 406.

FIG. 5 shows an object drawn in a perspective environment with a three point perspective. A three point perspective image comprises at least two vanishing points at the horizon line and at least one vanishing point directly above or below the object. A three point perspective view, typically called a worm's eye view, is used primarily when representing objects from a viewpoint that is directly above or below the object. In a three point perspective image, one set of vertical edges converge to a vanishing point directly above or below the object. Thus, the perspective environment 500 of FIG. 5 also includes a vanishing point 501 directly above the object 502. The set of vertical edges 503, 504 and 505 are drawn in a manner that if those edges are extended beyond the object 502, they would meet at the vanishing point 501 directly above object 502.

Currently in order to create a perspective image, users of existing 2D graphics software are unable to utilize any system provided reference points or grid lines. However, some users desiring to create perspective images in order to provide a more realistic image would manually draw reference points or lines, such as the horizon lines, vanishing points, horizontal planes with lines, as discussed above in the image to aid them in drawing objects with perspective.. However, drawing the reference points and/or lines is very painstaking and not very accurate. Moreover, the users would themselves have to draw the objects based on their perception of how the objects would or should appear in perspective. After drawing objects on the grid, users would have to delete the reference points and/or lines from the drawings. Moreover, if the object to be drawn was complicated, for example objects not comprising solely of straight lines, it would be difficult to show the object correctly in perspective.

Furthermore, in existing systems as the reference points and/or lines are not movable, therefore if the perspective view has to be changed for any reason or if the object has to be moved for any reason, then the object, the reference points and/or the lines have to be drawn again. This is especially inconvenient in case of complex objects. For example, if the outlines of a building are drawn using manual reference points and/or lines and another building has to be drawn next to the first building, then in order to draw the perspective for the second building, the reference points and/or lines would have to be drawn again causing further inconvenience to the user.

On the other hand, a preferred embodiment 2D drawing environment of the present invention, allows a user to place or apply drawing objects, preferably vector objects, in a perspective environment without the user having to manually draw the grids of the perspective environment. In the preferred embodiment, the present invention includes a perspective tool and a grid environment. The tool and the grid environment of the preferred embodiment allow a user to create two dimensional drawings with a three dimensional effect by easily drawing from within a perspective viewpoint. The drawing environment of the present invention preferably includes an easy to use user interface. A user can draw and create various images in this environment simply by clicking and/or dragging the objects.

The user interface of the preferred embodiment allows the user to create a perspective environment comprising one or more perspective grids by selecting different parameters. Such parameters include for example the number of vanishing points, density (grid cell size), the grid colors, the location of the grid, a location of the horizon, the location of the vanishing points, location of the floor line, and/or other like parameters. The number of vanishing points is preferably selected from one, two or three. The grid cell size is preferably selected by entry of a cell size parameter.

In the preferred embodiment, once a grid has been defined it can be stored for later use. Also in the preferred embodiment, a stored grid can be deleted, if desired. Moreover, a particular grid may be duplicated without having to specify the parameters of the grid again.

In the preferred embodiment, multiple grids can be defined and stored in the same image. However, it is preferred that only one grid be active in an image at one time so that objects to be associated with and/or applied to that grid can be easily drawn.

Figure 6:
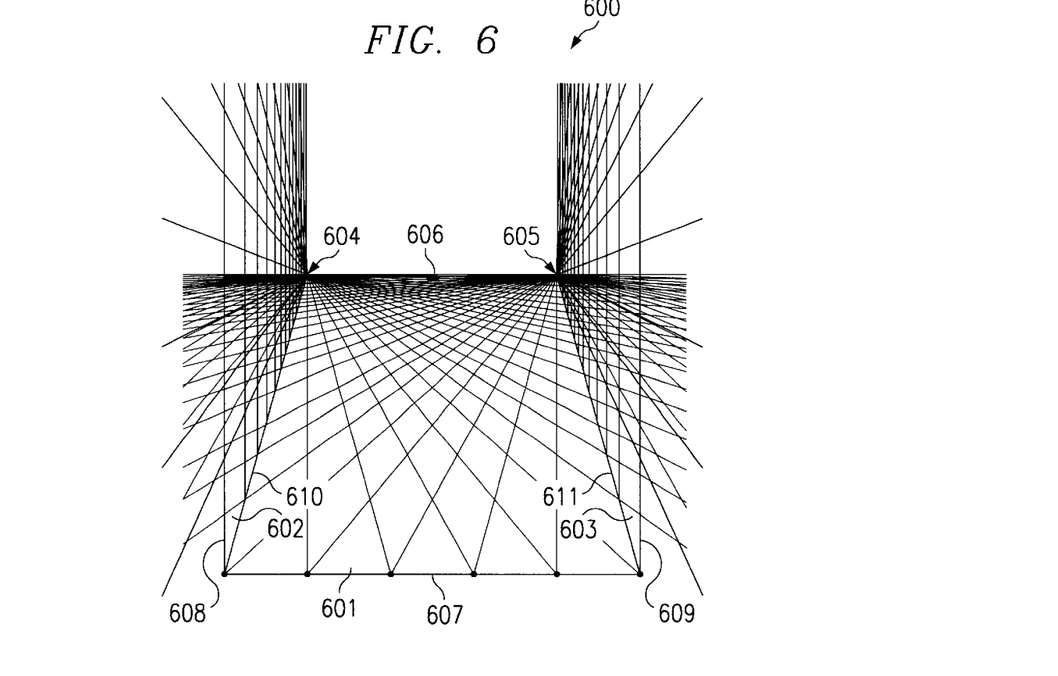
FIG. 6 shows a preferred embodiment grid with two vanishing points.

In the preferred embodiment, a grid with two vanishing points as shown in FIG. 6 is selected. Grid 600 of FIG. 6 preferably includes three surfaces—a horizontal plane 601, a first vertical wall 602 and a second vertical wall 603. As shown in FIG. 6, each of the vertical walls is substantially perpendicular to the horizontal wall 601. The vanishing points 604 and 605 are located on a horizon line 606. The first vertical wall 602 converges at vanishing point 604 and the second vertical wall 603 converges at vanishing point 605. Grid 600 of FIG. 6 also preferably comprises a floor line 607. The different horizontal and/or vertical walls can be provided with different colors, for example, to distinguish the different walls from each other to aid the user.

A grid is typically defined by various parameters, such as name of the grid, the number of vanishing points, the grid cell size, first vertical wall color, second vertical wall color, horizontal plane color, location of first vanishing point, location of second vanishing point, location of third vanishing point, location of horizon line, location of floor line, location of first vertical wall, location of second vertical wall, flags to indicate which wall or plane of the grid is hidden, and/or the like.

A grid will typically comprise a set of points connected to an associated vanishing point. In order to draw a grid on the screen, a set of points which are to be connected to the vanishing points are determined. Once these points are determined lines are drawn between the set of points and the vanishing point. Thus, for a horizontal plane (such as plane 601 of FIG. 6) the set of points ("set of floor points") are typically located along the floor line 607 and for a vertical grid (such as grids 602 and/or 603 of FIG. 6) the set of points ("set of vertical points") are typically located along a line (such as lines 608 and/or 609) which is substantially perpendicular to the floor line. In cases where the grid environment comprises three vanishing points, the set of points for the vertical grids or walls may be located along a line which is at an angle to the floor line along the vertical axis Lines are drawn from the set of points to the respective vanishing points. Thus, as shown in FIG. 6, for the horizontal plane 601, lines are drawn from the set of floor points along the floor line 607 to the first vanishing point 604 and also from the set of floor points along the floor line 607 to the second vanishing point 605. For the first vertical grid 602, lines are drawn from the set of vertical points along line 608 to the first vanishing point 604.

For the second vertical grid 603, lines are drawn from the set of vertical points along line 609 to the second vanishing point 605. Because the preferred embodiment grid of FIG. 6 comprises two vanishing points, the vertical grids further preferably include lines substantially parallel to the vertical lines. Thus, for example, for the first vertical grid 602, preferably lines parallel to line 608 are drawn from a set of points ("set of horizontal points") along a line 610 along the intersection of the horizontal plane 601 and the first vertical grid 602. For the second vertical grid 603, preferably lines parallel to line 609 are drawn from a set of points ("set of horizontal points") along a line 611 along the intersection of the horizontal plane 601 and the second vertical grid 603. In embodiments, where the grid environment comprises three vanishing points, lines from the set of horizontal points are drawn such that these lines preferably converge at the third vanishing point.

The distance between the set of points used to draw the grid along any direction depends on the selected cell size of the grid. As mentioned above, the grid cell size is preferably selected from a number of parameters from large to small. Thus, for a grid with a large cell size, there are fewer points in a given set of points (and thus fewer lines in the grid) and for a grid with smaller cell size there are more points in a given set of points (and thus more lines in the grid).

The drawing environment of a preferred embodiment of the present invention is capable of providing two modes—a perspective mode and a non-perspective mode. In the non-perspective mode a user can draw objects using conventional drawing tools. For example, a user can draw an object in the 2D environment just like existing graphics software, such as FreeHand 5.0. In the perspective mode, the user can draw new objects with a desired perspective or can modify existing objects to provide a realistic perspective image. Moreover, in the preferred embodiment, the user can interchange between the perspective and non-perspective modes as many times as it desires. For example, the user can draw an object using conventional drawing tools and then apply the object to a perspective grid which can be used to provide a desired perspective to the object.

In the perspective mode, a perspective tool is preferably used to provide the desired perspective to the object. The perspective tool is capable of manipulating the perspective grid. For example, the perspective tool can be used to manipulate the grid, such as by changing the placement of the vertical and/or horizontal surfaces, moving the vanishing points, and/or moving the horizon and/or floor lines. In the preferred embodiment, one or more of the above may be selected by the perspective tool and dragged to a new location to modify an existing grid. Thus, a user could, for example, select a vanishing point and drag it to a new location. The grid associated with the selected vanishing point would be redrawn with the vanishing point at the new location. The horizon line could also be easily moved, such as by selecting and dragging the horizon line to a new location. This may be especially useful when it is desirable to move two or more vanishing points on the same horizon line together to a new location.

Moreover, a grid surface created by using the present invention can be easily moved to a new location. For example, a user could select a grid surface, such as by clicking on any portion of the grid surface with a perspective tool, preferably a portion of the grid surface not having an object, and then specifying a new location for the grid surface, such as by dragging the selected grid surface to a new location. Moving the grid surfaces, such as the floor plane or the vertical planes attached to the vanishing points will result in the grid being redrawn at the new location with the same vanishing point. Thus, for example, if a user wanted to keep a horizon line and the floor line at a particular location, the vertical wall could still be moved a number of times to draw different objects within the perspective graphics environment.

Accordingly, in a preferred embodiment of the present invention, a grid could be created as discussed above. One of the planes of the grid could be moved to a new location to create a new grid. For example, a vertical wall could be moved so that the vertical wall is rotated along an associated vanishing point. FIGS. 9A–9D show different portions of a vertical grid rotated around a vanishing point. The new grid could then be saved, if desired and the same wall or another wall of the grid moved to a new location. The different grids could be hidden, if desired. The user could make the different grids visible as and when the user needed the grid to work on a particular object. Thus, a user could draw an object on the grid at one location, rotate the grid to a new location and then draw another object on the grid at the new location, thereby providing a consistent perspective image of the two objects.

In a preferred embodiment, if desired dynamic feedback of the movement of the grid may be provided to the user. Dynamic feedback of the grid movement may be useful, for example, to assist the user in determining the desired new location of the grid.

If desired, the grids can be saved so that once a graphics environment with the desired grids is set up, it can be used to provide a perspective view to different objects. Thus, an environment set up in one image can be used in a different image to provide similar perspective views in the different images.

If desired, a cursor associated with the perspective tool may indicate which component of the drawing environment has been selected for movement. For example, the cursor may include a left arrow, a right arrow, a bottom arrow, or a top arrow as part of the cursor when a left vertical grid, a right vertical grid, a floor line, or a vanishing point respectively is selected for movement. This feature of the perspective tool as described above would be especially useful when there are a number of grids along with the associated vanishing points in a particular drawing environment.

The grids of the preferred embodiment of the present invention may be hidden or visible. Thus, when a particular grid is not being used, it may be hidden while still displaying related objects to keep visual confusion to a minimum. Also, objects may still be added and manipulated even though the grid is hidden. Preferably, when the drawing environment is in the perspective mode, double clicking on a vanishing point, preferably using the perspective tool, toggles the associated vertical grids on or off. In the preferred embodiment, the horizontal grid may be toggled on or off by double clicking on the horizon line. Of course, any of the grids may be toggled on or off by other means, such as by selecting from a menu, by voice commands, and/or the like.

In the preferred embodiment, a 1-point perspective grid comprises a horizontal plane, a vertical plane, a floor line, a horizon line and a vanishing point; a 2-point perspective grid comprises a horizontal plane, a first vertical plane (a left wall) associated with a first vanishing point, a second vertical plane (a right wall) associated with a second vanishing point, a floor line and a horizon line; and a 3-point perspective grid comprises a horizontal plane, a first wall associated with a first vanishing point, a second wall associated with a second vanishing point, a floor line, and a horizon line, wherein the first and second walls are at an angle to the horizontal plane such that if the first and second walls are extended they would meet at the third vanishing point.

The perspective tool of the preferred embodiment is preferably used for placing or applying an object to a perspective grid to provide a perspective view of the object. In the preferred embodiment, in order to place a particular object on the perspective grid, an object can be selected, for example, by clicking on the object with the perspective tool. The selected object is bounded preferably by a bounding box to create a bounded object. In the preferred embodiment, a perspective envelope box is created by using at least in part the bounding box.

Figure 13:
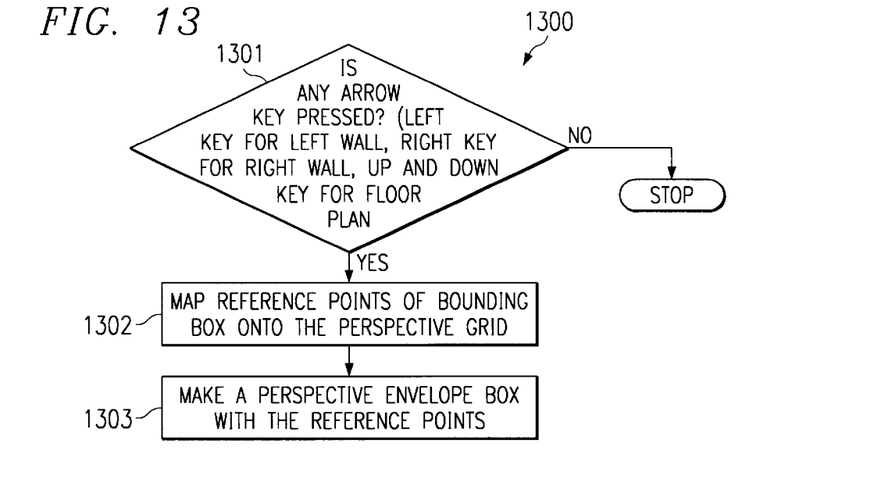
FIG. 13 shows a preferred embodiment flowchart for creating a perspective envelope box.

The preferred embodiment method for creating the perspective envelope box is described herein with reference to FIG. 13. A perspective view of the object is created by using at least in part the perspective envelope box and the bounded object. The preferred embodiment method for creating the perspective view of the object is described herein with reference to FIG. 14. In the preferred embodiment, the creation of the bounding box, the bounded object, the perspective envelope box and/or the perspective view of the object is transparent to the user, i.e. the user does not have to manually create the bounding box, the bounded object, the perspective envelope box and/or the perspective view of the object.

Figure 7:
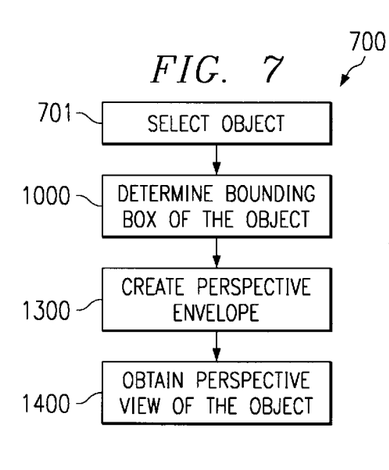
FIG. 7 shows a preferred embodiment flowchart for applying an object to a grid.

FIG. 7 shows a preferred embodiment flowchart 700 for applying an object to a grid in order to obtain a perspective view of the object. As shown in flowchart 700, in step 701 an object to be applied to a grid is selected. If desired, multiple objects of a same group may be selected at one time. In step 1000, the bounding box of the selected object is determined. The details of the determination of the bounding box of the selected object is discussed herein with reference to FIG. 10. In step 1300, the perspective envelope box is created by using at least in part the bounding box of the selected object as described in detail below with reference to FIG. 13. Finally, in step 1400, a perspective view of the object is obtained by using at least in part the perspective envelope box created in step 1300.

Figure 8:
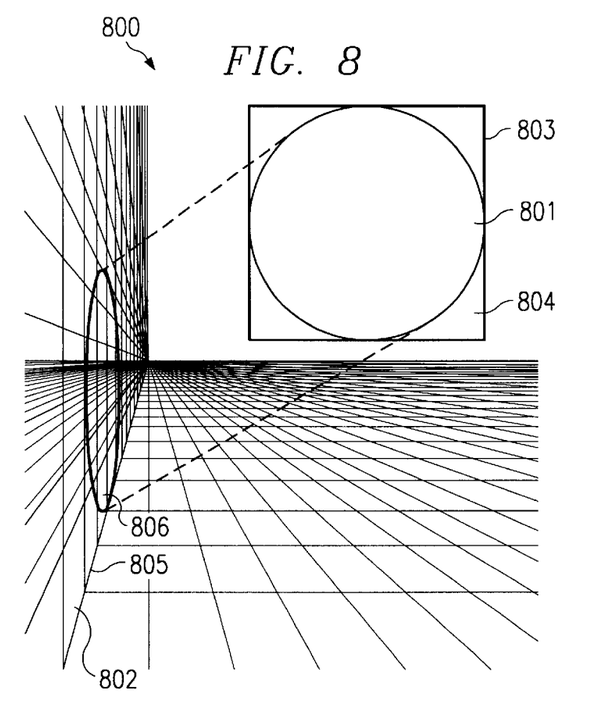
FIG. 8 shows an object applied to a perspective grid.

FIG. 8 shows an object applied to a perspective grid via grid 800. As shown in FIG. 8, an object 801 is selected to be applied to a perspective grid 802. Object 801 may be drawn using conventional drawing tools or it may be imported from other software. Upon selection of object 801, the object is bounded in a bounding box 803 to create a bounded object 804. The bounding box 803 along with object 801 is applied to grid 802 so that the bounding box 803 is transformed into perspective envelopee box 805 and a perspective view 806 of object 801 is obtained.

In the preferred embodiment, a user can apply the selected object 801 to perspective grid 802 by using an input device. For example, the arrow keys may be used to place the object on the perspective grid. Thus, in a 2-point perspective environment, the object may be placed on the left vertical wall by pressing the left arrow key while moving the object, and the object may be placed on the right vertical wall by pressing the right arrow key while moving the object.

In a 2-point perspective environment, if the object is to be applied to a floor grid or plane, the user preferably specifies the vanishing point with which a particular floor plane is associated. Thus, the object may be placed on a floor plane associated with the left vanishing point by pressing the up arrow key while moving the object and the object may be placed on a floor plane associated with the right vanishing point by pressing the down arrow key while moving the object. In the preferred embodiment, selecting an object and moving it around the image will not cause the object to be applied to a perspective grid. However, if desired the perspective environment may be set up such that by moving the object on the screen while in the perspective mode and placing the object in close proximity to a visible grid will cause the object to be snapped to the nearest visible grid.

Figure 10:
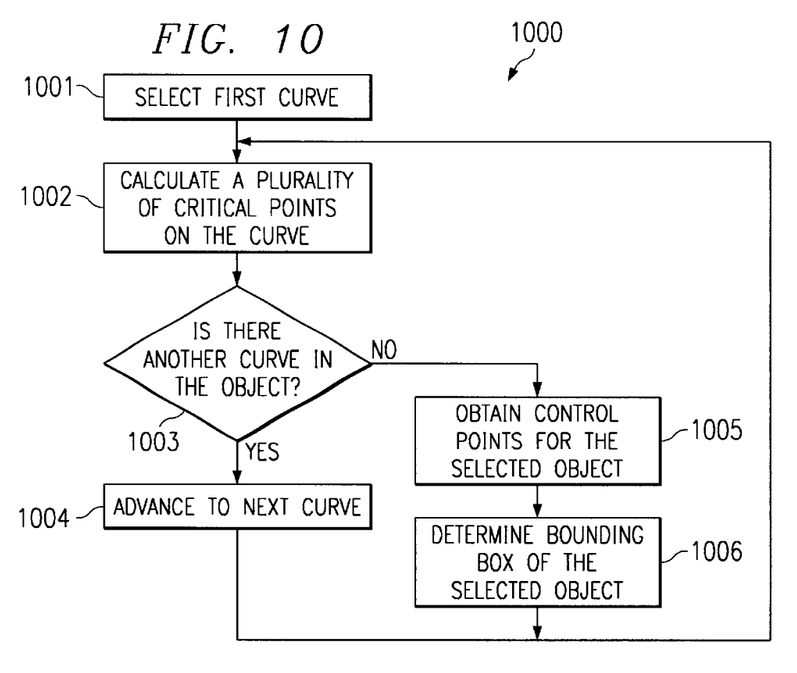
FIG. 10 shows a preferred embodiment flowchart for determining a bounding box of an object.

FIG. 10 shows a preferred embodiment flowchart 1000 for determining the bounding box of an object, for example the object selected in step 701 of the flowchart of FIG. 7. The selected object may comprise of one or more curves. In step 1001, a curve on the selected object is determined to be the first curve. This may be done arbitrarily or by utilizing an algorithm known to one of skill in the art. In step 1002, a plurality of critical points on the selected curve are determined. In the preferred embodiment, a point on a curve is called a critical point if the first derivative at the point is zero. In step 1003, a determination is made as to whether there are any other curves in the selected object. If there is another curve, then in step 1004, the next curve is selected and the critical points for the selected curves are determined. Once the critical points for all the curves or a representative sample of the curves has been determined for the selected object, then in the preferred embodiment in step 1005, the determined critical points are utilized to obtain a set of control points for the selected object. In the preferred embodiment, the control points are the leftmost, the rightmost, the topmost and the bottommost points of the selected object. In step 1006, the bounding box of the selected object is determined by utilizing the control points. In the preferred embodiment, a set of reference points is determined by utilizing in part the set of control points to provide the four corners of the bounding box.

Figure 11:
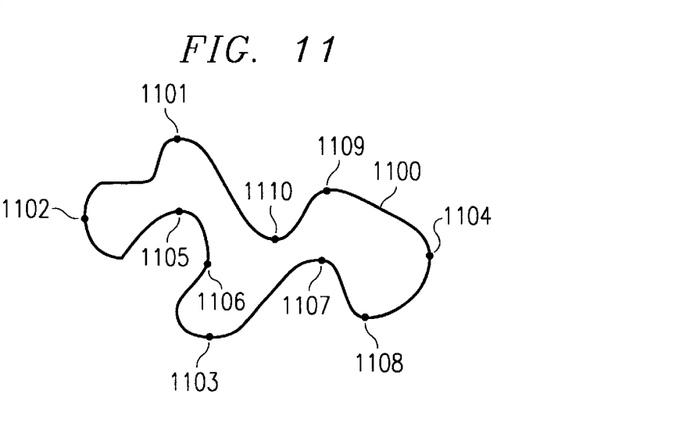
FIG. 11 shows an exemplary object.

FIG. 11 shows an exemplary object 1100. As shown in FIG. 11, object 1100 includes a plurality of critical points, for example points 1101 through 1110. In the preferred embodiment, based on the coordinates of these critical points, a set of control points is obtained. For example, the critical points with the minimum and maximum value of the y coordinate and the critical points with the minimum and maximum value of the x coordinate are determined to be the control points. As shown in FIG. 11, points 1101 and 1103 are the critical points with the minimum and maximum y coordinate value and points 1102 and 1104 are the critical points with the minimum and maximum x coordinate value. Thus, points 1101, 1102, 1103, and 1104 are selected as the control points. As can be seen from FIG. 11, control point 1101 is the topmost point of object 1100, control point 1102 is the leftmost point of object 1100, control point 1103 is the bottommost point of object 1100 and control point 1104 is the rightmost point of object 1100.

Figure 12:
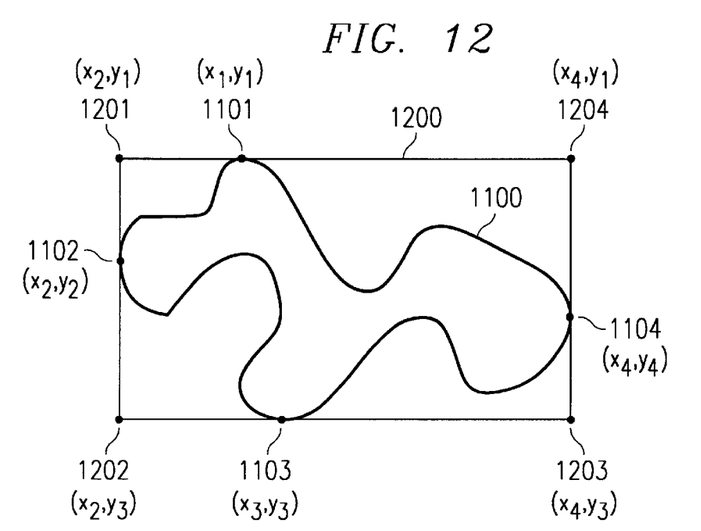
FIG. 12 shows an exemplary bounding box for the exemplary object of FIG. 11.

FIG. 12 shows an exemplary bounding box 1200 for the exemplary object of FIG. 11. As shown in FIG. 12, reference points 1201, 1202, 1203, 1204 of the bounding box 1200 may be determined from the control points 1101, 1102, 1103, and 1104. Thus, for example if the coordinates of control points 1101, 1102, 1103, and 1104 are (x1, y1), (x2, y2), (x3, y3) and (x4, y4) respectively, where x2 and x4 are the minimum and maximum x coordinate values and y3 and y1 are the minimum and maximum y coordinate values, then the coordinates of the control points 1201, 1202, 1203, and 1204 are given by (x2, y1), (x2, y3), (x4, y3) and (x4, y1) respectively. Thus, the bounding box of the selected object has reference points given by (x2, y1), (x2, y3), (x4, y3) and (x4, y1). Although the bounding box illustrated in FIG. 12 is rectangular, the present invention is not so limited and in alternative embodiments the bounding box could be any shape, such as for example, a circle, a rhombus, and/or the like.

FIG. 13 shows a preferred embodiment flowchart 1300 for creating a perspective envelope box. As shown in FIG. 13, in step 1301 a determination is made as to whether the selected object is to be applied to a perspective grid. Thus, as discussed herein with reference to FIG. 8, if any arrow key is pressed while moving the object with the perspective tool then depending on the pressed arrow key, it is determined that the selected object is to be applied to the corresponding grid. In step 1302, the reference points of the bounding box are mapped onto the selected perspective grid. Thus, as shown in FIG. 8, if the left arrow key is pressed while the selected object is being moved then the reference points, say the corners of the bounding box 803 are mapped onto the left vertical wall 802. If the bounding box is box 1200 of FIG. 12, then the four reference points 1201, 1202, 1203 and 1204 are mapped onto the left vertical wall 802. In step 1303, a perspective envelope box, for example box 805 of FIG. 8, is created from the mapped reference points, for example, by joining the corresponding reference points with each other.

In the preferred embodiment, the step (1302) of mapping the reference points of the bounding box from the non-perspective plane onto the perspective grid utilizes a Perspective Transformation Formula. In the preferred embodiment, the Perspective Transformation Formula is given by $$[X^*, Y^*] = [X/(pX+qY), Y/(pX+qY)],$$

where [X, Y] is the location of the point on the non-perspective plane;

[X*, Y*] is the location of the point on the perspective grid; and p and q are parameters based on the location of starting points and vanishing points of the grid. In the preferred embodiment, p=0, if there is no vanishing point in the x-coordinate; else p=1/(X–distance between starting point and vanishing point of the grid)

Also in the preferred embodiment, q=0, if there is no vanishing point in the y-coordinate; else q=1/(Y–distance between starting point and vanishing point of the grid).

In alternative embodiments, a different Perspective Transformation Formula may be used, if desired.

Figure 14:
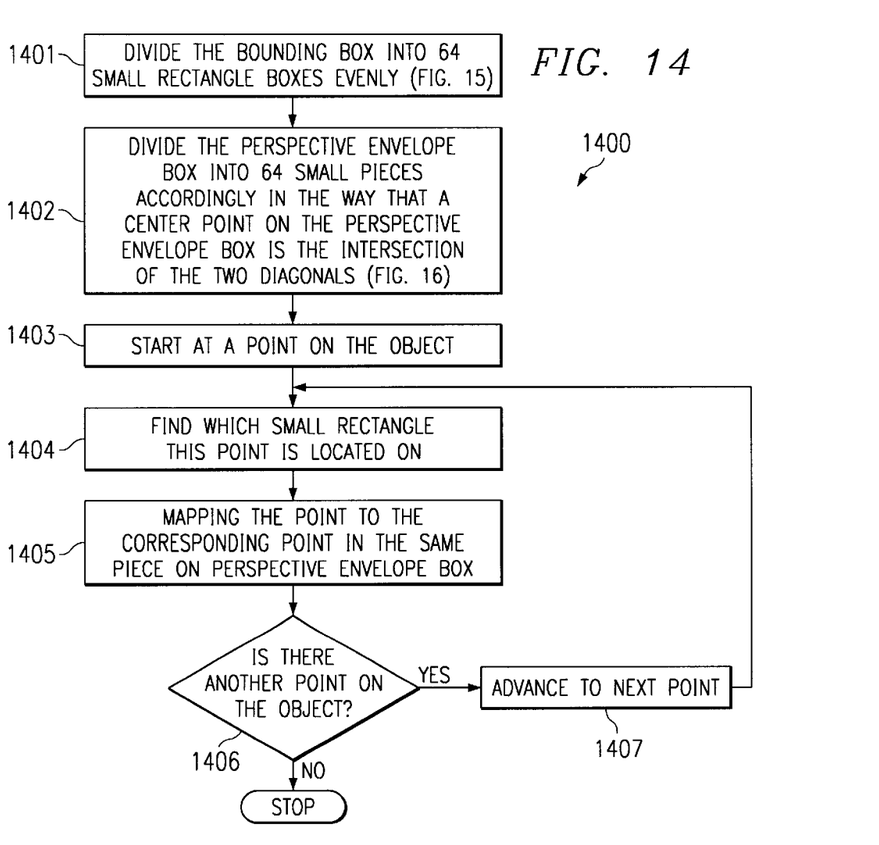
FIG. 14 shows a preferred embodiment flowchart for obtaining a perspective view of the object.

FIG. 14 shows a preferred embodiment flowchart 1400 for obtaining a perspective view of the object. In step 1401, the bounding box is preferably divided into a plurality of segments. In the preferred embodiment, the bounding box is divided into sixty-four (64) equal sized rectangular segments. Although in the preferred embodiment the bounding box is divided into sixty-four segments, the invention is not so limited and in alternative embodiments the number of segments may be different depending, for example, on the size of the bounding box, the desired quality of mapping, and/or the like. Also, although in the preferred embodiment, the segments are equally sized the invention is not so limited and in alternative embodiments the segments need not be equally sized.

Figure 16:
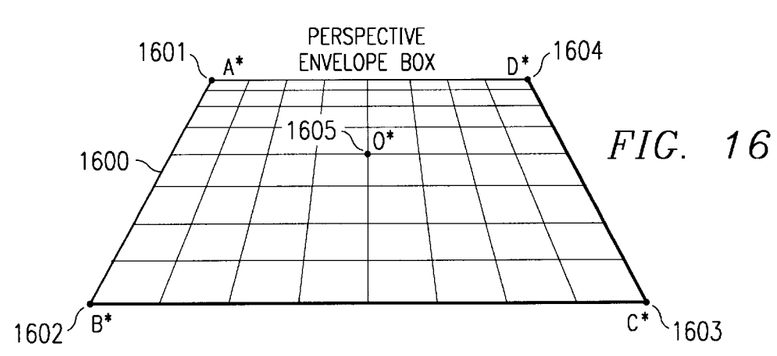
FIG. 16 shows an exemplary perspective envelope of the exemplary bounding box of FIG. 15.

In step 1402, the perspective envelope box is divided, preferably into a number of segments equal to the number of segments into which the bounding box is divided. In the preferred embodiment, this is accomplished by finding the intersection of the diagonals of the perspective envelope box. The point of intersection of the diagonals corresponds with the center point of the bounding box. In the case of a 1-point perspective graphics environment, such as shown in FIG. 16, a horizontal line parallel to the horizontal edges of the perspective envelope box and passing through the center point is drawn. A second line intersecting the horizontal line and passing through the center point is also drawn such that if the second line is extended beyond the perspective envelope box it would pass through a vanishing point of the perspective envelope box. Thus, the perspective envelope box is initially divided into four (4) segments. Each of these segments is further divided by determining the intersection point of the diagonals, drawing a first line substantially parallel to the horizontal edge, and drawing a second line which passes through the intersection point and would also pass through the vanishing point if extended beyond the perspective envelope box. The process is repeated until the perspective envelope is divided into a desired number of segments.

Although in the embodiment shown in FIG. 16, the horizontal lines are substantially parallel to the horizontal edges of the perspective envelope box the invention is not so limited and in alternative embodiments the vertical lines may be parallel to the vertical edges of the perspective envelopee box, if desired, depending on the location of the vanishing point. Furthermore, although in the embodiment shown in FIG. 16, the horizontal lines are substantially parallel to the horizontal edges of the perspective envelope box, the invention is not so limited. For example, in a 2 point perspective graphics environment these lines are drawn so that the lines pass through the center point and if extended beyond the edges of the perspective envelope box would also pass through the second vanishing point.

In step 1403 a point on the object is selected. In step 1404, a determination is made as to the particular segment on the bounding box in which the first point of the object is located. In step 1405, the selected point is mapped to the corresponding point in the corresponding segment on the perspective envelope box. In step 1406, a determination is made as to whether there is any other unmapped point on the object. If there is an unmapped point on the object then in step 1407, the next unmapped point is selected. The process of determining the particular segment on the bounding box in which the point is located and mapping the point to the corresponding point in the corresponding segment on the perspective envelope box is repeated until substantially all the points on the object have been mapped onto the perspective envelope to provide a perspective view of the object.

Figure 15:
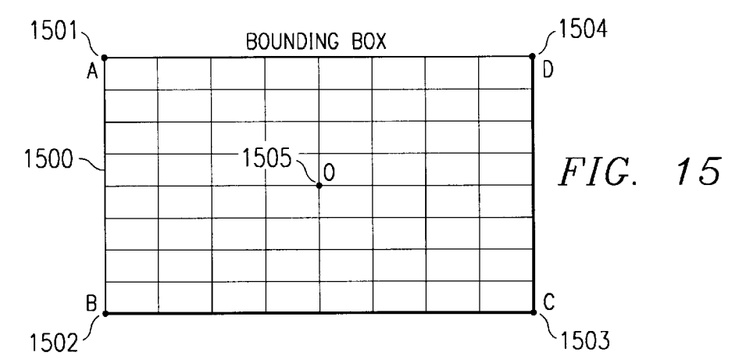
FIG. 15 shows an exemplary bounding box with a center point.

FIG. 15 shows an exemplary bounding box 1500 with a center point O (1505) and reference points A (1501), B (1502), C (1503) and D (1504). FIG. i6 shows an exemplary perspective envelopee box 1600 of the exemplary bounding box 1500 of FIG. 15 with a center point O* (1605) and reference points A* (1601), B* (1602), C* (1603) and D* (1604). As can be seen from FIG. 15, the center point O falls on the intersection of the diagonals AC and BD. Thus, the center point O* of FIG. 16 is determined by finding the intersection point of the diagonals A*C* and B*D*. The perspective envelope box 1600 of FIG. 16 is divided into a plurality of segments as discussed herein with reference to the flowchart of FIG. 14.

In the preferred embodiment, when a user selects an object with the perspective tool and moves it on the screen, preferably by clicking and dragging the object, a check is made to determine if the object is on a perspective grid or not. If the object is on a perspective grid, then the object is moved along the grid. Thus, a user does not have to perform any special operations, such as pressing a hot key, for example, an arrow key, to move the object along the grid. Furthermore, if a user desires to change the location of an object on the grid and place it at a different location, the user simply selects the object and moves it along the grid. The present invention would change the shape and/or size of the object such that the displayed object corresponds to a perspective view of the object at the new location. In the prior art, in order to move an object from one location of a grid to another, the user would himself/herself have to visualize how the object would look in perspective at the new location and then accordingly draw the object at the new location. In the present invention, the change in the object due to movement of the object along the grid is transparent to the user.

Figure 17:
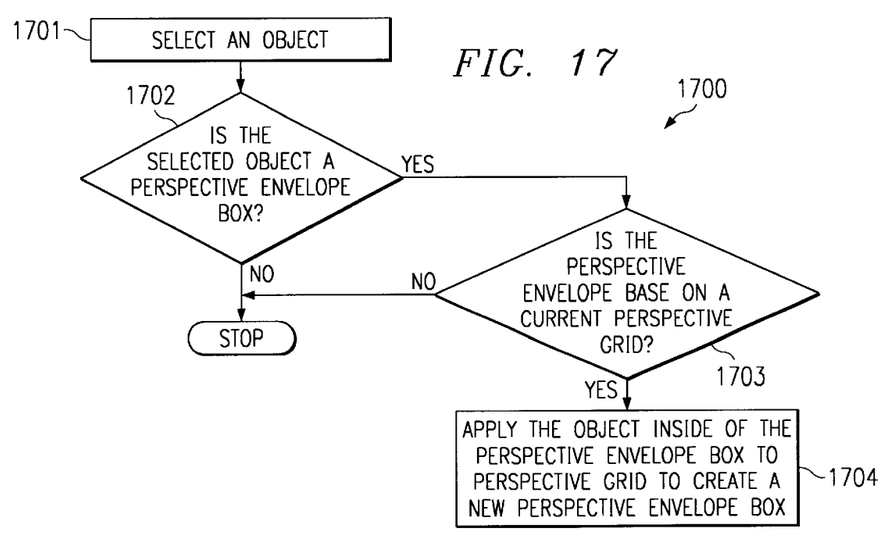
FIG. 17 shows a preferred embodiment flowchart for moving an object on a perspective grid.

FIG. 17 shows a preferred embodiment flowchart 1700 for moving an object on a perspective grid. In step 1701 an object to be moved is selected, for example by clicking on the object. In step 1702 a determination is made as to whether the selected object is a perspective envelope box. If the selected object is not a perspective envelope box (or is not bounded by a perspective envelopee box) then in the preferred embodiment, the object is an object in the normal plane and may be moved and/or transformed like an ordinary object as is known to one of skill in the art. If the selected object is a perspective envelope box (or is bounded by a perspective envelopee box) then in the preferred embodiment in step 1703 a determination is made as to whether the perspective envelopee box is on a current perspective grid. In the preferred embodiment, this determination is made by creating a new perspective envelope box for the selected object with regard to the current perspective grid such as is described for example with reference to steps 1302 and 1303 of the flowchart of FIG. 13. If the newly created perspective envelope box is not the same as the selected perspective envelopee box (or the perspective envelopee box of the selected object) then it is concluded that the selected perspective envelope box (or the perspective envelopee box of the selected object) is not on the current perspective grid. Otherwise, it is concluded that the selected perspective envelope box (or the perspective envelopee box of the selected object) is on the current perspective grid.

If the selected perspective envelope box (or the perspective envelopee box of the selected object) is on the current perspective grid, then in step 1704, the object inside the selected perspective envelope box (or the selected object) is applied to the perspective grid to create a new perspective envelope box with the associated object at the new location (preferably designated by the input device, such as the position of the mouse) on the grid. This may be accomplished by the method described with reference to the flowchart of FIG. 13.

Figure 18:
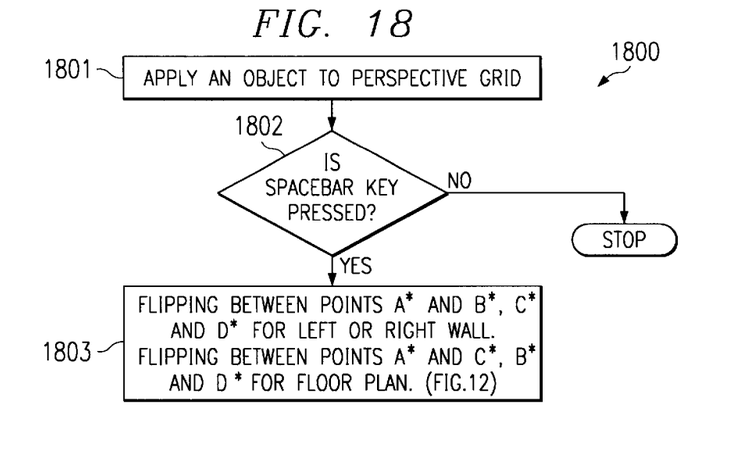
FIG. 18 shows a preferred embodiment flowchart for flipping an object on a perspective grid.

In the preferred embodiment, when a user provides a predetermined input to the system, for example by pressing a hot key, such as the space bar, while placing an object on the perspective grid, a flipped perspective view of the object is created. FIG. 18 shows a preferred embodiment flowchart 1800 for flipping an object on a perspective grid. In step 1801, an object is applied to the perspective grid preferably as discussed herein with reference to the flowchart of FIG. 7. In step 1802, a determination is made as to whether a predetermined input has been provided to the system. If a predetermined input has been provided to the system then in step 1803 a horizontal flip and/or a vertical flip may be provided to the object. In the preferred embodiment, a horizontal flip is provided when the object is applied to a vertical wall. Also, in the preferred embodiment a vertical flip is provided when the object is applied to the floor plane. During a horizontal flip, points 1201 and 1204, for example, of FIG. 12 are flipped and points 1202 and 1203 are flipped so that the perspective envelope box is inverted horizontally. During a vertical flip, points 1201 and 1202 are flipped and points 1204 and 1203 are flipped so that the perspective envelope box is inverted vertically. When this flipped perspective envelope box wraps the object, a flipped perspective view of the object is created. Alternatively, the process may provide arbitrary rotation, instead of the preceding 180 degree translations.

Figure 19:
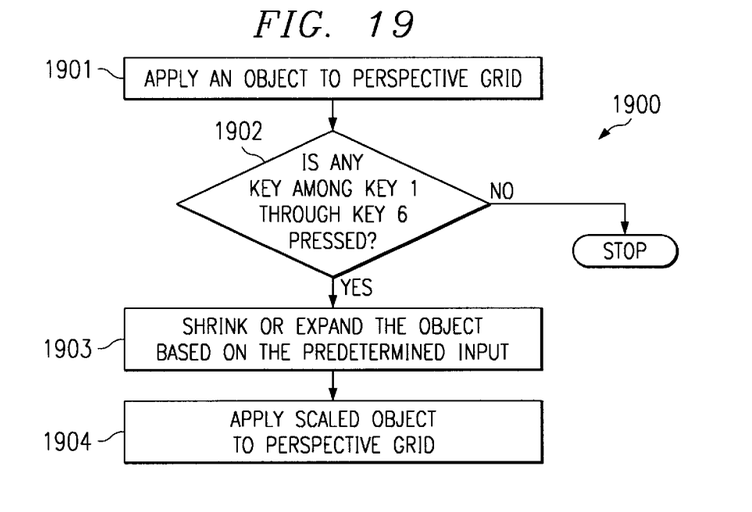
FIG. 19 shows a preferred embodiment flowchart for scaling an object on a perspective grid.

In the preferred embodiment, when a user provides a predetermined input to the system, for example by pressing a hot key, such as any key from 1 through 6, while placing an object on the perspective grid, a scaled perspective view of the object is created. FIG. 19 shows a preferred embodiment flowchart 1900 for scaling an object on a perspective grid. In step 1901, an object is applied to the perspective grid preferably as discussed herein with reference to the flowchart of FIG. 7. In step 1902, a determination is made as to whether a predetermined input has been provided to the system. If a predetermined input has been provided to the system then in step 1903 the object is scaled based on the input. In the preferred embodiment, Table I is used to determine the amount and direction of scaling:

TABLE I

| PREDETERMINED INPUT | SCALING |
|---|---|
| Key 1 | Shrink 1 pixel size in both X and Y coordinates |
| Key 2 | Expand 1 pixel size in both X and Y coordinates |
| Key 3 | Shrink 1 pixel size in X coordinate |
| Key 4 | Expand 1 pixel size in X coordinate |
| Key 5 | Shrink 1 pixel size in Y coordinate |
| Key 6 | Expand 1 pixel size in Y coordinate |

In step 1904, the scaled object is applied to the perspective grid preferably as discussed herein with reference to the flowchart of FIG. 7 to provide a scaled perspective view of the object.

In the preferred embodiment, the object that is applied to a perspective grid is not attached to the grid. Thus, when the grid is moved the object does not move with the grid. Rather in the preferred embodiment, the object stays at the old location and retains the transformations that have been applied to the object. In an alternative embodiment, the user may specify, for example by pressing a predetermined key, such as the "shift"key, that an object on the grid move with the grid. In such an embodiment, when a grid is moved, an object on the grid moves with the grid to the new location. The present invention automatically transforms the shape and/or size of the object at the new location based on the location of the grid.

Figure 9A:
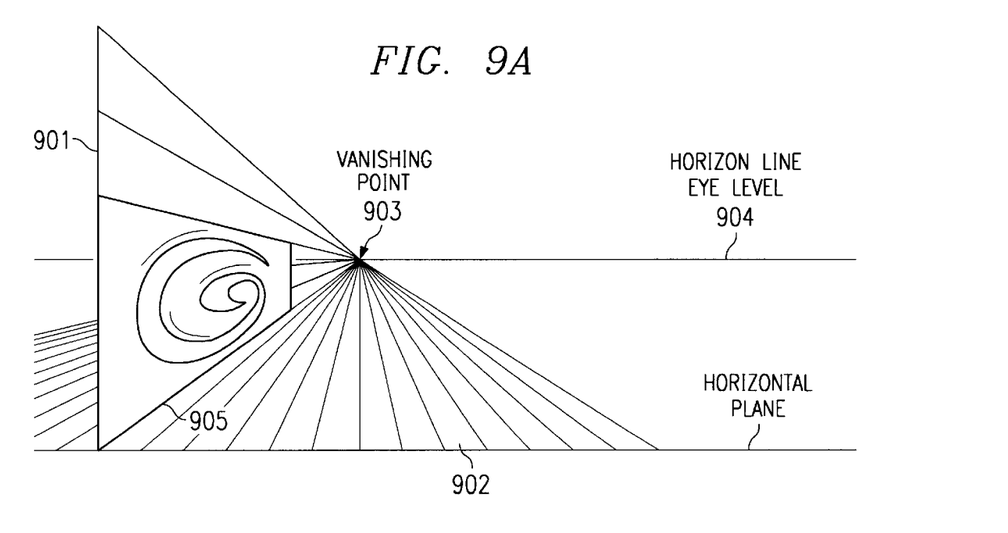
FIGS. 9A–9D show different positions of a vertical grid rotated around a vanishing point.
Figure 9B:
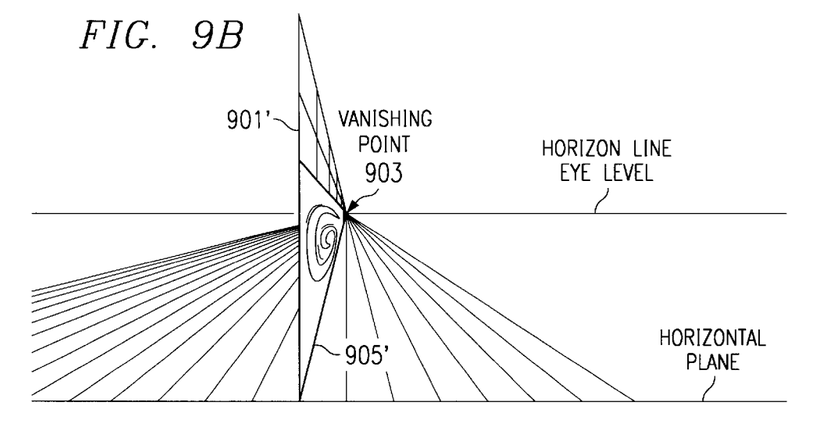
Figure 9C:
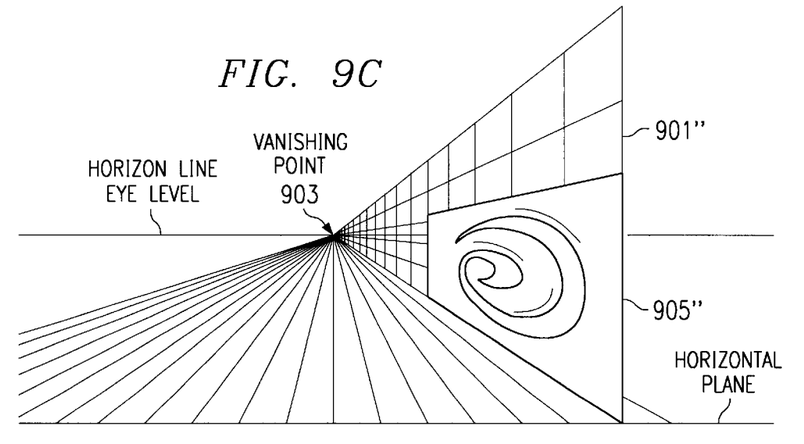

FIGS. 9A–9D show different positions of a vertical grid rotated around a vanishing point. In FIG. 9A a vertical grid 901 is shown. The vertical grid 901 shown in FIG. 9A is perpendicular to a horizontal grid 902. The vertical and horizontal grids converge at a vanishing point 903 on a horizon line 904. Vertical grid 901 includes an object 905 that has been applied to it. In FIG. 9B, vertical grid 901 of FIG. 9A is shown rotated along the vanishing point 903 as vertical grid 901'. In the embodiment shown, object 905 moves with the vertical grid. In FIG. 9B object 905 of FIG. 9A is redrawn as object 905' to provide the desired perspective view to the object at the new location of the vertical grid. FIG. 9C shows the vertical grid 901' of FIG. 9B rotated further along the vanishing point 903 as vertical grid 901". In the embodiment shown, object 905' of FIG. 9B moves with the vertical grid. In FIG. 9C, object 905' of FIG. 9B is redrawn as object 905" to provide the desired perspective view at the new location of the vertical grid.

Figure 9D:
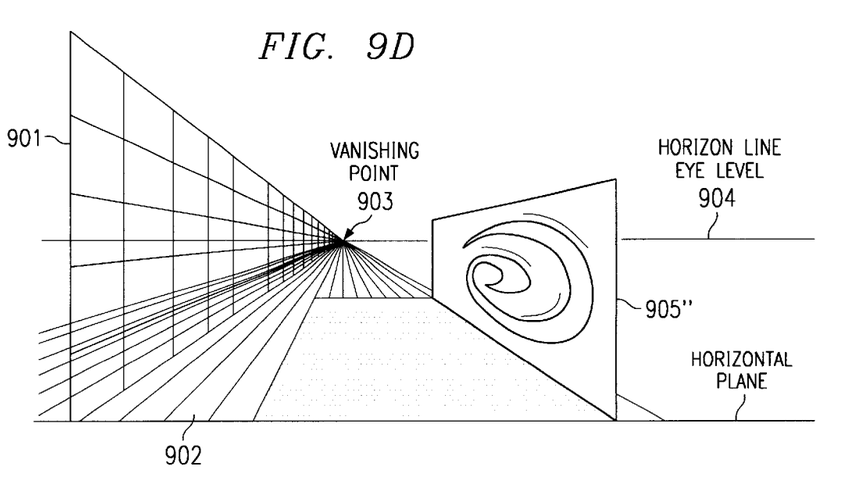

FIG. 9D shows the vertical grid 901 rotated back to its original position, i.e. the portion shown in FIG. 9A. However, as shown in FIG. 9D, object 905" of FIG. 9C does not move with the grid 901. Instead the object 905" stays at its last position. In the preferred embodiment, when an object, such as object 905" is released from the grid, the object retains the transformations. If desired, when an object is released from the grid, all transformations of the object may be removed from the selected object. Moreover, the present invention allows a user to selectively release objects from a grid such that some objects continue to move with the grid, while others stay at the same location. Furthermore, if desired, the user can specify whether the unattached objects maintain their last configuration or are restored to their original configuration upon being released from the grid.

Figure 20:
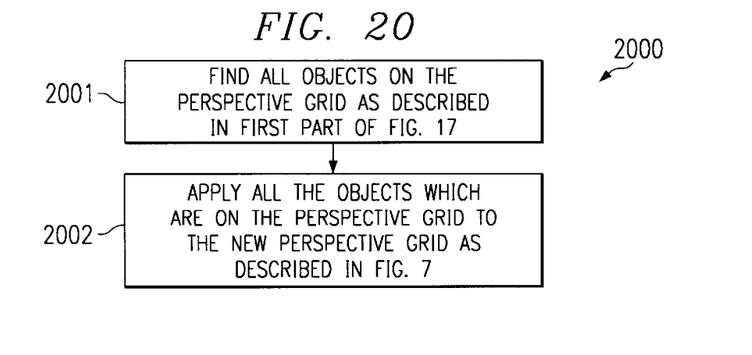
FIG. 20 shows a preferred embodiment flowchart for moving an object along with a perspective grid.

FIG. 20 shows a preferred embodiment flowchart 2000 for moving an object along with a perspective grid. In step 2001 a determination is made as to whether the perspective grid to be moved has an object attached to it. In the preferred embodiment, this is accomplished by the method described herein with regard to step 1703 of the flowchart of FIG. 17. If the perspective grid to be moved has an object attached to it, then in step 2002, the attached object is applied to the perspective grid at its new location. In the preferred embodiment, this is accomplished by the method described herein with regard to the flowchart of FIG. 7.

Although, the present invention has been described above with regard to applying an existing or newly created object onto a grid to provide a desired perspective to the object, the invention is not so limited. In alternative embodiments, two dimensional drawing tools can be used directly on a grid. Thus, an object can be drawn directly on the grid, if desired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing a perspective view of an object in a two dimensional drawing environment, comprising the steps of:

creating a two dimensional perspective grid drawing environment;

drawing an object in said two dimensional drawing environment;

selecting a grid in said two dimensional drawing environment; and applying said drawn object to said selected grid thereby automatically providing a perspective view of said object, wherein said applying includes:

mapping points from said drawn object to said selected grid utilizing the formula $[X^*,Y^*]=[X/(pX+qY),Y/(pX+qY)]$, wherein $[X,Y]$ is a location of a respective point in said drawn object, $[X^*,Y^*]$ is a location of a point on said grid, and p and q are variable parameters.

2. The method of claim 1, wherein said creating step comprises the step of:

selecting one or more parameters for creating said two dimensional perspective grid drawing environment.

3. The method of claim 2, wherein said two dimensional drawing environment in addition to said grid comprises:

a horizon line; and at least one vanishing point on said horizon line which acts as a vanishing point for said grid.

4. The method of claim 3, wherein said two dimensional drawing environment further comprises:
a floor line, wherein said floor line is substantially parallel to said horizon line.

5. The method of claim 3, wherein said one or more parameters is selected from a group consisting of number of vanishing points, grid cell size, a location of said horizon line, a location of said grid, and a location of said vanishing point.

6. The method of claim 5, wherein said selecting one or more parameters step is performed by selecting from a graphical user interface.

7. The method of claim 1, wherein said selecting step comprises the step of:
selecting a predefined grid from said two dimensional drawing environment, wherein said predefined grid has been previously stored on a memory of a computer system.

8. The method of claim 1, wherein said grid is selected from a plurality of predefined grids.

9. The method of claim 1, wherein said applying step comprises the step of:
dragging said object onto said grid in said two dimensional drawing environment.

10. The method of claim 1, wherein said two dimensional drawing environment is a 1-point perspective drawing environment further comprising a second grid, a floor line, a horizon line, and a vanishing point, wherein said selected grid is a horizontal grid and said second grid is a vertical grid.

11. The method of claim 1, wherein said two dimensional drawing environment is a 1-point perspective drawing environment further comprising a second grid, a floor line, a horizon line, and a vanishing point, wherein said selected grid is a vertical grid and said second grid is a horizontal grid.

12. The method of claim 1, wherein said two dimensional drawing environment is a 2-point perspective drawing environment further comprising a second grid, a third grid, a floor line, a horizon line, a first vanishing point and a second vanishing point, wherein said selected grid is a horizontal grid and said second grid is a vertical grid associated with said first vanishing point, and wherein said third grid is a vertical grid associated with said second vanishing point.

13. The method of claim 12, wherein said second grid and said third grid meet at a third vanishing point.

14. The method of claim 1, wherein said two dimensional drawing environment is a 2-point perspective drawing environment further comprising a second grid, a third grid, a floor line, a horizon line, a first vanishing point and a second vanishing point, wherein said selected grid is a vertical grid associated with said first vanishing point, said second grid is a horizontal grid and wherein said third grid is a vertical grid associated with said second vanishing point.

15. The method of claim 14, wherein said selected grid and said third grid meet at a third vanishing point.

16. The method of claim 9, wherein said object is dragged onto said grid while pressing an arrow key to place said selected object onto said grid.

17. The method of claim 16, wherein said object is placed onto a left vertical grid when a left arrow key is pressed, said object is placed onto a right vertical grid when a right arrow key is pressed, said object is placed onto a floor plane associated with a left vanishing point when a down arrow key is pressed and said object is placed onto a floor plane associated with a right vanishing point when an up arrow key is pressed.

18. The method of claim 1, wherein said object is a vector object.

19. The method of claim 1, wherein said object is a non-vector object.

20. The method of claim 1, wherein said applying step comprises the steps of:
selecting said object;
determining a bounding box of said selected object;
creating a perspective envelope box in part from said determined bounding box; and
obtaining said perspective view of said selected object in part from said perspective envelope box.

21. The method of claim 14, wherein said determining step comprises the steps of:
determining a plurality of critical points on at least a first curve of said selected object; and
determining a set of control points from said plurality of critical points.

22. The method of claim 21, wherein a point on said at least first curve is a critical point if a first derivative at said point is zero.

23. The method of claim 21, wherein said step of determining said set of control points comprises the step of:
determining a topmost point (x1, y1), a leftmost point (x2, y2), a bottommost point (x3, y3), and a rightmost point (x4, y4) from said plurality of critical points.

24. The method of claim 23, further comprising the step of:
determining a set of reference points utilizing in part said set of control points to provide the corners of said bounding box.

25. The method of claim 24, wherein said set of reference points is given by (x2, y1), (x2, y3), (x4, y3) and (x4, y1).

26. The method of claim 25, wherein said creating step comprises the steps of:
mapping each of said set of reference points of said bounding box onto said selected grid to provide a set of mapped reference points; and
joining points within said set of mapped reference points to create said perspective envelope box.

27. The method of claim 26, wherein said step of obtaining said perspective view comprises the steps of:
a. dividing said bounding box into a plurality of segments;
b. dividing said perspective envelope box into an equal number of plurality of segments;
c. mapping a point on said object from said bounding box onto a corresponding segment of said perspective envelope box;
d. repeating step (c) until substantially all points on said object have been mapped onto a corresponding segment of said perspective envelope box thereby providing said perspective view of said object.

28. The method of claim 27, wherein the number of segments into which said bounding box is divided depends in part on a desired quality of mapping.

29. The method of claim 27, wherein said step of dividing said perspective envelope box comprises the steps of:
a. determining an intersection point of the diagonals of said perspective envelope box;
b. drawing a first line through said intersection point and a first vanishing point such that said first line intersects opposing sides of said perspective envelope box thereby dividing said perspective envelope box into two components; and c. drawing a second line through said intersection point and a second vanishing point such that said second line intersects a different set of opposing sides of said perspective envelope box, wherein said first line and said second line divide said perspective envelope box into four components.

d. repeating steps (a), (b) and (c) with regard to each component of said perspective envelope box until said perspective envelope box is divided into said plurality of components equal in number to said plurality of components into which said bounding box is divided.

30. The method of claim 27, wherein said step of dividing said perspective envelope box comprises the steps of:

a. determining an intersection point of the diagonals of said perspective envelope box;

b. drawing a first line through said intersection point and a first vanishing point such that said first line intersects opposing sides of said perspective envelope box thereby dividing said perspective envelope box into two components; and c. drawing a second line through said intersection point wherein said second line is parallel to a different set of opposing sides of said perspective envelope box, wherein said first line and said second line divide said perspective envelope box into four components.

d. repeating steps (a), (b) and (c) with regard to each component of said perspective envelope box until said perspective envelope box is divided into said plurality of components equal in number to said plurality of components into which said bounding box is divided.

31. A system, comprising:

a first data structure defining a grid in a two-dimensional drawing environment that defines a simulated perspective view of a plane in relation to three dimensions, wherein said data structure identifies at least one vanishing point;

a second data structure defining a graphical object in a plane defined by only two dimensions;

a mapping algorithm for displaying said graphical object, at a location on said grid determined in response to input from a user using said two-dimensional drawing environment, according to said simulated perspective view of said plane in relation to three dimensions by mapping elements of said second data structure according to said first data structure, wherein said mapping algorithm applies a mapping relationship defined by $[X^*,Y^*]=[X/(pX+qY), Y/(pX+qY)]$, wherein $[X,Y]$ is a location of a point in said graphical object, $[X^*,Y^*]$ is location of a point on said grid, and p and q are parameters.

32. The system of claim 30 wherein p is calculated utilizing a location and a distance of the location from a vanishing point associated with said grid.

33. The system of claim 30 wherein said first data structure defines a floor line.

34. The system of claim 30, wherein said first data structure defines a wall line.

* * * * *